June 24, 1930.    O. J. GROEHN    1,765,372
METHOD OF MAKING PANEL JOINTS
Original Filed Jan. 26, 1926
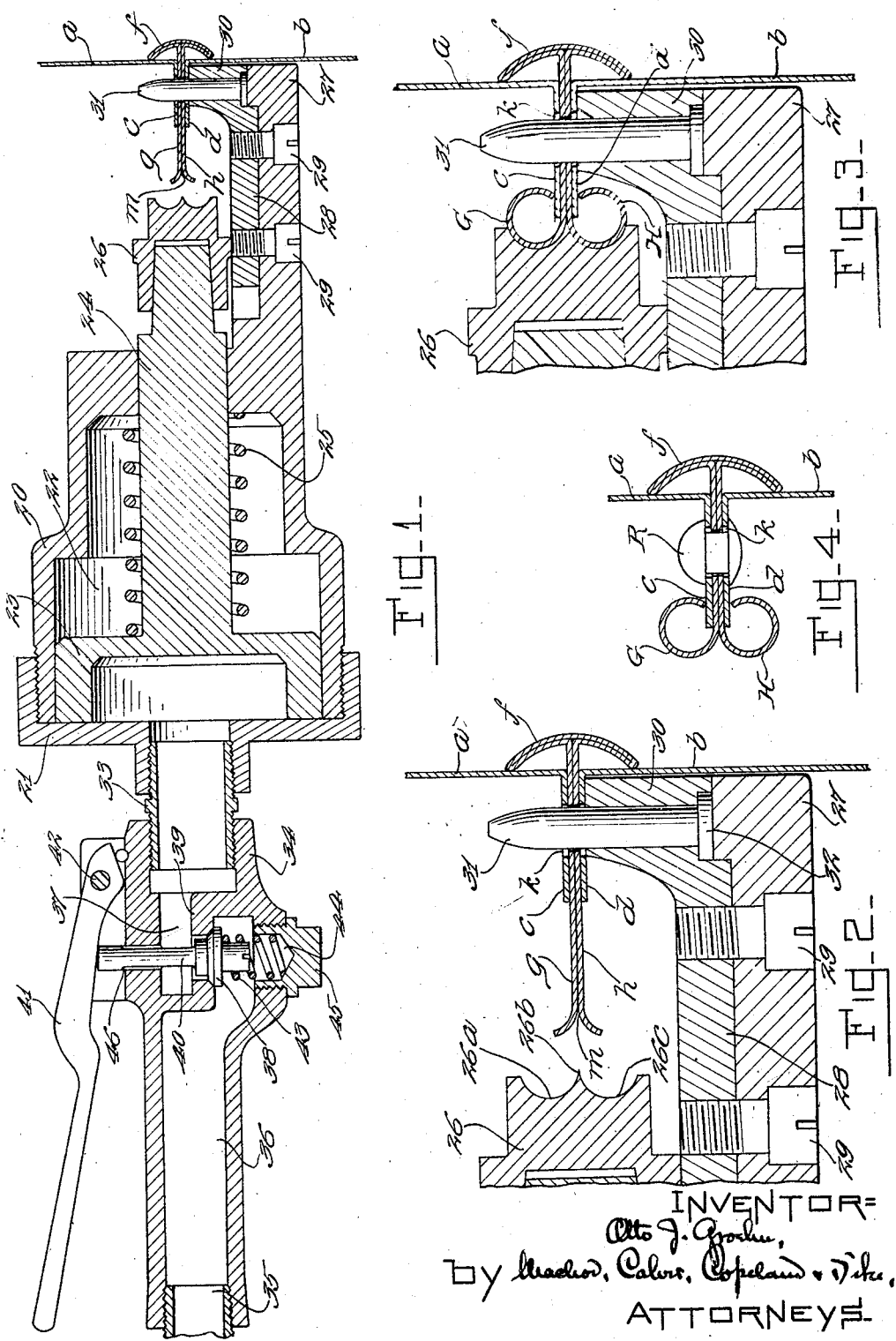
INVENTOR=
Otto J. Groehn,
By Meadow, Calver, Copeland & Dike,
ATTORNEYS.

Patented June 24, 1930

1,765,372

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

METHOD OF MAKING PANEL JOINTS

Original application filed January 26, 1926, Serial No. 83,960. Divided and this application filed October 1, 1927, Serial No. 223,459, and in Great Britain November 1, 1926.

This invention relates to the joining of contiguous plates or panels, and especially, although not exclusively, to the formation of reinforced panel joints for sheet metal automobile bodies in accordance with the principles explained in a prior application for Letters Patent filed January 26, 1926, Serial No. 83960, patented February 26, 1929, No. 1,703,618, of which this case is a division.

In the construction of certain types of closed automobile bodies formed from sheet metal panels, the adjacent or proximate edges of contiguous panels are formed with inturned flanges which are secured together with an interposed molding strip having an enlarged head at the exterior of the body to form a bead which covers and conceals the joint. In accordance with the present invention, the free edges of the molding strips project beyond the free edges of the panel flanges and are bent or curled thereover to form a rigid interlocking connection, the operation of so bending the flanges serving also to pull the joint together, whereby the panels are rigidly drawn into their proper relative positions and the head or bead of the molding strip brought into close engagement with the exterior faces of the panels. In this manner the formation of the panel joints is effected by operations performed wholly at the interior of the body, so that danger of accidental injury to the exposed exterior surfaces of the panels is avoided, and pre-finishing of said surfaces permitted.

One of the important features of the invention consists in curling or bending the edges of the molding strips over the edges of the panel flanges by an outward edgewise thrust, and simultaneously exerting an inward reaction to said outward thrust tending to draw the parts tightly into position.

Other objects of this invention will appear in the following description and appended claims, reference being had to the accompanying drawings forming a part of this specification, wherein like reference characters designate corresponding parts in the several views, and wherein:

Fig. 1 is a longitudinal section illustrating a curling tool in operative position to form a panel joint in accordance with the invention.

Fig. 2 is an enlarged detail view, illustrating the beginning of the crimping or curling operation.

Fig. 3 is a similar view illustrating the completion of said operation.

Fig. 4 is a fragmentary sectional view of the resulting joint.

In certain types of closed automobile bodies, the enclosed body portions thereof are constructed of sheet metal panels which are finished and reenforced by moldings at the joints between the adjacent panel sections. As illustrated in the drawings, the panels $a$ and $b$ of the automobile body are formed at the adjacent edges thereof with inturned flanges $c$ and $d$, respectively. The molding is preferably T-shaped in cross section and may be formed by folding a strip of sheet metal upon itself to form a curved bead or head $f$ and inwardly turned superimposed flanges $g$ and $h$ forming a two-ply flange which is held between the flanges $c$ and $d$ of the panels. It will be seen that the bead or head $f$ of the molding strip overlaps the adjacent marginal portions of the panels, engaging the outer surfaces thereof and providing a means for concealing and finishing the joint therebetween. The flanges $g$ and $h$ of the molding preferably project a substantial distance inwardly beyond the free edges of the panel flanges $c$ and $d$, and these edges of the molding are, in accordance with the invention, bent or curled in opposite directions so as to embrace and enclose the free edges of the flanges $c$ and $d$, thereby providing a strengthened interlocking connection between the parts.

In my prior application aforesaid I have disclosed and claimed a tool particularly adapted for the purpose of practicing the method constituting the subject of the present case, said tool operating to crimp or curl the projecting edges of the superimposed molding flanges g and h, over the edges of the panel flanges c and d, the edges of said molding flanges being curled to form beads or rolls G and H (see Figs. 3 and 4) at opposite sides of the panel flanges. Referring to Fig. 1, the tool comprises a chambered support or casing 20 closed at one end by means of a cap 21 threaded thereto and having a central chamber 22 within which operates a piston 23. This piston is provided with a forwardly projecting piston rod 24 and surrounding the piston rod is a compression spring 25 which is interposed between the piston 23 and a wall of the chamber 22. Mounted on the end of the rod 24 is a curling hammer or die member 26 which is constructed at the working face thereof to bend back or curl the free edges of the molding flanges g and h. The working end of the hammer or die member 26 is provided with a pair of tangential arcuate surfaces or grooves $26^a$ and $26^c$ separated by means of a tapered rib or wedge $26^b$. As clearly seen from Fig. 2 the tapered relatively sharp rib or wedge $26^b$ of the die is adapted to enter between and separate the free edges of the molding flanges g and h, as shown at m, and these edges will be curled rearwardly over the edges of the panel flanges c and d, forming beads G and H concentric with the curved die faces $26^a$ and $26^c$.

The casing or support 20 of the tool is provided with a forward extension 27 located at one side of the path of movement of the die or hammer 26. Secured, as by screws or bolts 29, to the upper face of the extension 27 is a holder or block 28 terminating at its forward end in an upward guide 30 drilled to receive a stud 31 forming a hook. The superimposed flanges c, d, g and h of the panels and molding strip are previously drilled so as to provide vertically alined holes therethrough through which may be inserted bolts or tubular rivets R (see Fig. 4) after the curling operation so as to secure the parts together. The hook 31 is adapted to be inserted through the alined holes k in the molding and panel flanges, thereby enabling the tool to be held against the work during operation and causing the molding flanges to be bent or curled between the die 26 and the hook 31.

In the present instance, the piston 23 is operated to shift the die or hammer 26 forwardly by pneumatic means. The cap 21 of the supporting casing 20 is connected by means of a suitable threaded coupling 33 with a tubular handle 34 to the rear end of which is connected a fluid or air conduit 35. The handle 34 is provided with a main inlet passage or chamber 36 and an outlet passage or chamber 37 separated by means of a partition 39. This partition has a passage therethrough controlled by means of a suitable valve 38 provided with a stem 40 projecting through a hole drilled in the wall of the handle 34, said stem having bleeding passages 46. The outer end of the valve stem 40 is engaged by a lever 41 pivoted at 42 to the handle support, and by swinging the lever 41 inwardly the valve 38 will be opened against the action of the compression spring 43 interposed between a shoulder formed on the valve and the bottom of a chamber 44 in a removable plug 45.

In practising the present invention by the use of the tool above described, it will be seen that the projecting stud 31 forms a hook which may be inserted by the operator through the vertically alined holes k in the panel flanges c and d. Thereupon the operator presses down the handle lever 41 so as to open the valve 38 and admit fluid under pressure from the passage 36 into the passage 37, resulting in shifting the piston 23 forwardly against the action of spring 25. The forward movement of the piston will shift the hammer or die 26 forwardly, causing the V-shaped rib or wedge $26^b$ of the die to separate the free edges of the molding flanges g and h and exert an outward edgewise thrust thereon. The continued forward movement of the die 26 will curl the molding strips over the panel flanges in the manner shown in Figs. 3 and 4. By reference to the latter figures it will be seen that the holes through the panel flanges c and d are preferably slightly larger than the corresponding holes in the molding flanges g and h, so that when the hook 31 is engaged with the latter a certain amount of relative movement between the molding and the panels is permitted. The re-action of the hook 31 to the thrust of the curling die 26 exerts an inward pull upon the molding flanges, so that as the inner edges of the latter are curled over the panel flanges, the parts will be drawn tightly into position. Upon completion of this operation, the parts may, if desired, be further secured together by bolts or rivets R inserted through the alined holes.

Having thus described my invention, I claim:—

1. The hereindescribed method of joining the flanged edges of two panels or plates by means of a molding strip having a head and a flange, said method including interposing the molding flange between the panel flanges and exerting upon said molding flange opposed pressures respectively in the directions and at the points to draw said head into close engagement with the faces of said panels and to crimp or curl said molding flange over the free edges of said panel flanges.

2. The hereindescribed method of making a joint between panels having inturned flanges which includes providing a molding strip having a flange and a head, inserting the flange of the molding strip between the panel flanges with the head engaging the outer faces of the panels, and exerting an outward edgewise thrust upon the inner edge of the molding flange to bend the same over the edges of the panel flanges while exerting an inward pull upon the molding strip.

3. The hereindescribed method of making a joint between panels having inturned flanges which includes providing a molding strip having a flange and a head, inserting the flange of said molding strip between the panel flanges with said head engaging the outer faces of the panels, and bending the inner edge of the molding strip flange over the edges of the panel flanges while exerting an inward pull upon the former.

4. The hereindescribed method of making a joint between panels having inturned flanges which includes providing a molding strip having a flange and a head, inserting the flange of said molding strip between the panel flanges with said head engaging the outer faces of the panels, and exerting opposite forces on said molding strip flange tending respectively to draw the same inwardly and to curl the inner edge thereof in opposite directions over the edges of the panel flanges.

5. The hereindescribed method of making a joint between panels having inturned flanges which includes providing a molding strip having a two-ply flange and a head, inserting the flange of said molding strip between the panel flanges with said head engaging the outer faces of the panels, and curling the inner edges of the plies of the molding strip flange in opposite directions respectively over the edges of the panel flanges.

6. The hereindescribed method of making a joint between panels having inturned flanges which includes providing a molding strip having a two-ply flange and a head, inserting the flange of said molding strip between the panel flanges with said head engaging the outer faces of the panels, and curling the inner edges of the plies of the molding strip flange in opposite directions respectively over the edges of the panel flanges, while exerting an inward pull upon said molding strip flange.

7. The hereindescribed method of joining exterior panels in the manufacture of automobile bodies which includes interposing between inturned flanges on the edges of the panels the flange of a T-shaped molding strip having its head engaging the exterior faces of the panels and drawing the molding strip flange inwardly at the interior of the body while securing said molding and panel flanges together.

8. The hereindescribed method of joining exterior panels in the manufacture of automobile bodies which includes interposing between inturned flanges on the edges of the panels the flange of a T-shaped molding strip having its head engaging the exterior faces of the panels and drawing the molding strip flange inwardly at the interior of the body while bending the same to secure it to said panel flanges.

9. The hereindescribed method of joining exterior panels in the manufacture of automobile bodies which includes interposing between inturned flanges on the edges of the panels the flange of a T-shaped molding strip having its head engaging the exterior faces of the panels and drawing the molding strip flange inwardly at the interior of the body while curling or crimping the inner edge of said molding flange over the inner edges of said panel flanges to secure said flanges together.

In testimony whereof I affix my signature.

OTTO J. GROEHN.